US011078888B2

(12) United States Patent
Klein-Hitpass (10) Patent No.: US 11,078,888 B2
(45) Date of Patent: Aug. 3, 2021

(54) WIND TURBINE TRANSMISSION

(71) Applicant: FLENDER GMBH, Bocholt (DE)

(72) Inventor: Arno Klein-Hitpass, Aachen (DE)

(73) Assignee: Flender GmbH, Bocholt (DE)

( * ) Notice: Subject to any disclaimer, the term of this patent is extended or adjusted under 35 U.S.C. 154(b) by 124 days.

(21) Appl. No.: 16/322,839

(22) PCT Filed: Aug. 2, 2017

(86) PCT No.: PCT/EP2017/069498
§ 371 (c)(1),
(2) Date: Feb. 1, 2019

(87) PCT Pub. No.: WO2018/024761
PCT Pub. Date: Feb. 8, 2018

(65) Prior Publication Data
US 2019/0186469 A1 Jun. 20, 2019

(30) Foreign Application Priority Data

Aug. 4, 2016 (DE) .......................... 102016214452.9

(51) Int. Cl.
*F03D 80/70* (2016.01)
*F16H 57/021* (2012.01)
(Continued)

(52) U.S. Cl.
CPC ............ *F03D 15/00* (2016.05); *F03D 80/70* (2016.05); *F16H 1/46* (2013.01); *F03D 80/50* (2016.05);
(Continued)

(58) Field of Classification Search
CPC ........... F03D 80/70; F16H 2057/02078; F16H 57/021; F16H 1/06; F16H 57/00; F05B 2260/4031
See application file for complete search history.

(56) References Cited

U.S. PATENT DOCUMENTS 2,320,379 A * 6/1943 Niekamp .................. F16H 1/20
74/421 A
2,547,079 A * 4/1951 Gerentes ................. E21B 44/02
74/22 R
(Continued)

FOREIGN PATENT DOCUMENTS

CN 201358892 Y 12/2009
CN 102312928 A 1/2012
(Continued)

OTHER PUBLICATIONS

PCT International Search Report and Written Opinion of International Searching Authority dated Oct. 25, 2017 corresponding to PCT International Application No. PCT/EP2017/069498 filed Aug. 2, 2017.
(Continued)

*Primary Examiner* — Sherry L Estremsky
(74) *Attorney, Agent, or Firm* — Henry M. Feiereisen LLC (57) ABSTRACT

A wind turbine transmission includes a high-speed spur gear stage which includes a HSS spur gear and an HSS pinion meshing therewith on a HSS pinion shaft. The HSS spur gear is directly mounted in a transmission housing of the wind turbine transmission. A sun gear shaft of a transmission stage, which is mounted upstream of the high-speed spur gear stage, is directly coupled to the HSS spur gear.

10 Claims, 5 Drawing Sheets

(51) Int. Cl.
*F03D 15/00* (2016.01)
*F16H 1/46* (2006.01)
*F03D 80/50* (2016.01)

(52) U.S. Cl.
CPC ..... *F05B 2260/40311* (2013.01); *Y02E 10/72* (2013.01)

(56) References Cited

U.S. PATENT DOCUMENTS

| | | | | |
|---|---|---|---|---|
| 3,242,754 | A * | 3/1966 | Reed | F16H 57/021 74/421 R |
| 4,414,890 | A * | 11/1983 | Schiel | D21G 1/0006 100/162 B |
| 7,841,435 | B2 * | 11/2010 | Raue | B60K 17/043 180/65.51 |
| 8,338,980 | B2 * | 12/2012 | Minadeo | F03D 15/10 290/44 |
| 8,529,391 | B2 * | 9/2013 | Degeling | F03D 15/00 475/159 |
| 8,578,806 | B2 * | 11/2013 | Leimann | F03D 80/70 74/421 R |
| 8,629,591 | B2 * | 1/2014 | Vuolle-Apiala | F03D 15/10 310/75 R |
| 2008/0202269 | A1 | 8/2008 | Yamakawa | |
| 2010/0296933 | A1 * | 11/2010 | Hicks | F16H 57/025 416/170 R |
| 2011/0077120 | A1 * | 3/2011 | Dirk | F03D 15/00 475/348 |
| 2012/0051915 | A1 * | 3/2012 | suzuki | F03D 15/00 416/170 R |
| 2012/0301302 | A1 * | 11/2012 | Takeuchi | F03D 15/00 416/174 |
| 2013/0001952 | A1 * | 1/2013 | Paweletz | F03D 15/10 290/55 |
| 2015/0361962 | A1 * | 12/2015 | Hager | F16C 37/002 475/159 |
| 2019/0232747 | A1 * | 8/2019 | Tamura | B60K 17/08 |
| 2020/0044513 | A1 * | 2/2020 | Taikou | B60K 17/043 |

FOREIGN PATENT DOCUMENTS

| | | | | |
|---|---|---|---|---|
| CN | 203230542 U | 10/2013 | | |
| CN | 104061316 A | 9/2014 | | |
| CN | 104564544 A | 4/2015 | | |
| DE | 102007025755 A1 * | 12/2008 | ........ | B29C 45/5008 |
| DE | 10 2009 059 671 A1 | 6/2011 | | |
| DE | 202011107611 U1 | 11/2012 | | |
| EP | 2284420 A1 * | 2/2011 | ............ | F03D 15/10 |
| KR | 20110128054 A | 11/2011 | | |
| KR | 20110128062 A * | 11/2011 | .............. | F16H 1/46 |
| WO | WO 2012055832 A1 | 5/2012 | | |
| WO | WO 2015/032591 A1 | 3/2015 | | |

OTHER PUBLICATIONS

PCT International Preliminary Examination Report and Written Opinion of International Examination Authority dated Nov. 28, 2018 corresponding to PCT International Application No. PCT/EP2017/069498 filed Aug. 2, 2017.

Drescher, Ute; "Gleitlager ais Alternative zu Wälzlager in Windgetrieben", Konstuktionspraxis: Found on Oct. 20, 2020; Place found: https://www.konstuktionspraxis.vogel.de/gleiflager-ais-alternative-zu-waalziager-in-windgetrieben-a-338401/.

* cited by examiner

WIND TURBINE TRANSMISSION

CROSS-REFERENCES TO RELATED APPLICATIONS

This application is the U.S. National Stage of International Application No. PCT/EP2017/069498, filed Aug. 2, 2017, which designated the United States and has been published as International Publication No, WO 2018/024761 and which claims the priority of German Patent Application, Serial No, 10 2016 214 452.9, filed Aug. 4, 2016, pursuant to 35 U.S.C. 119(a)-(d).

BACKGROUND OF THE INVENTION

Multi-stage wind turbine transmissions are known in which the high-speed stage, also referred to as HSS (=High Speed Stage), has a spur gear stage comprising a spur gear and a pinion meshing with the spur gear, which is arranged on a pinion shaft. In this case, the spur gear is rotatably mounted in the transmission housing by way of a hollow shaft. WO2015/032591A1 (Siemens AG) Mar. 12, 2015 discloses such a multi-stage wind turbine transmission.

As a rule, high costs arise as a result of the very solid spur gear, the hollow shaft and the connection between the spur gear and the hollow shaft which is usually realized by means of a feather key- and/or shrink connection. Furthermore, the service capability is restricted—as a rule, only the HSS can be pulled out of the turbine with limited effort.

It is the object of the present invention to provide a wind turbine transmission which has advantages with regard to costs and service-friendliness.

SUMMARY OF THE INVENTION

This object is achieved according to the invention by a wind turbine transmission with a high-speed spur gear stage, having an HSS spur gear an HSS pinion meshing therewith on an HSS pinion shaft, wherein the HSS spur gear is directly mounted in a transmission housing of the wind turbine transmission and a sun gear shaft of a gear stage, which is mounted upstream of the high-speed spur gear stage, is directly coupled to the HSS spur gear.

The wind turbine transmission according to the invention comprises a high-speed spur gear stage having an HSS spur gear and an HSS pinion meshing therewith, wherein the HSS pinion is arranged on an HSS pinion shaft. An external tooth system of the HSS spur gear can mesh with an external tooth system of the HSS pinion.

The HSS spur gear is directly mounted in a transmission housing of the wind turbine transmission, i.e. the HSS spur gear is not seated, as in the case of conventional wind turbine transmissions, on a rotatably mounted hollow shaft. A journal or roller bearing for mounting the HSS spur gear is preferably in contact with the HSS spur gear directly.

A sun gear shaft of a gear stage which is mounted upstream of the high-speed spur gear stage, preferably a planetary gear stage, is directly coupled to the HSS spur gear. The sun gear shaft can be coupled to the HSS spur gear with a coupling, preferably a toothed coupling.

The designation high-speed is a relative term that is understandable in the context of the different gear stages of a multi-stage transmission. In a multi-stage wind turbine transmission, i.e. a wind turbine transmission with two or more gear stages, there are gear stages in which the rotating elements forming the gear stage move more slowly than in other gear stages: thus, a low-speed stage (LSS=Low Speed Stage) and a high-speed stage (HSS) can be distinguished in a two-stage transmission and a low-speed stage (LSS), an intermediate-speed stage (IMS=Intermediate Stage) and a high-speed stage (HSS) in a three-stage transmission.

The machine components assigned to the respective gear stages LSS, IMS and HSS are characterized by the respective prefixes LSS, IMS and HSS. For example, instead of the designation "IMS sun gear shaft", the designation "sun gear shaft of the IMS" can be used synonymously. The designations "drive-side" and "rotor-side" are used synonymously, likewise the designations "output-side" and "generator-side".

A bearing such as a journal or roller bearing can also be referred to as a bearing arrangement. In the case of a journal bearing, the bearing or the bearing arrangement comprises two parts moving relative to each other, between which a sliding gap is formed. In the case of a roller bearing, the bearing or the bearing arrangement comprises two bearing rings moving relative to each other with interposed rolling elements.

The inventive solution is characterized in that the HSS spur gear is directly mounted in the transmission housing by way of a journal or roller bearing and the sun gear shaft of the upstream planetary gear stage is directly coupled to the HSS spur gear, preferably by way of a coupling, in particular a toothed coupling. The HSS hollow shaft present in conventional wind turbine transmissions as a carrier of the HSS spur gear and the rotationally fixed connection between the hollow shaft and the HSS spur gear can thus be omitted. As a result, costs can be saved and the service life of the wind turbine transmission improved.

Advantageous embodiments and developments of the invention are specified in the dependent claims.

According to a preferred embodiment of the invention, the HSS pinion shaft forms the output shaft of the wind turbine transmission. It is advantageous in this case that a further gear stage, which is subject to friction and thus impairs efficiency, in which a rotation of the HSS pinion is transmitted to a rotation of a dedicated output shaft, is avoided.

In conventional wind turbine transmissions, the spur gear is mounted via a hollow shaft by means of a journal and/or roller bearing, wherein the hollow shaft is mounted on both sides, preferably on the two end faces of the spur gear, i.e. on the rotor side and on the generator side. Thus, bearing arrangements are to be provided and maintained on both sides of the spur gear; for this purpose, the transmission housing can also be designed in such a way that bearing points for the bearing arrangements are present at suitable positions within the transmission housing. According to a preferred embodiment of the invention, the HSS spur gear is mounted on one side. As the HSS spur gear is only mounted on one side, the transmission housing can be designed to be substantially simpler than in conventional wind power transmissions.

According to a preferred embodiment of the invention, the HSS spur gear is mounted on a carrier element firmly connected to the transmission housing, e.g. by means of a carrier element fixed to the transmission housing. It is advantageous in the case of a mounting by means of a separate carrier element, characterized in that the bearing arrangement can be designed optimally with regard to load-bearing capacity and service capability. When mounting directly in the transmission housing, it is advantageous that structural elements which are present in the transmission housing in any case are used for the bearing arrangement, and thus the number of components and the construction effort is kept low.

According to a preferred embodiment of the invention, the HSS spur gear is mounted on the rotor side or on the generator side in the transmission housing. Bearing points for the bearing arrangements can thus be created within the transmission housing at positions which are best suited for a respective transmission housing.

According to a preferred embodiment of the invention, the HSS spur gear is forged, welded or screwed from a plurality of elements or produced from a solid body by means of a cutting method. A combination of one of the aforementioned production methods is also conceivable. Likewise, the wheel body of the spur gear can be produced from a solid body by means of a cutting method. It is advantageous in this case that an optimum solution for the respective structural situation can be selected.

According to a preferred embodiment of the invention, the bearing of the HSS spur gear is integrated into the HSS spur gear. The HSS spur gear is preferably designed in such a way that there is space available in the wheel body for the bearing arrangement. For example, the web between the hub and the ring gear of the HSS spur gear is arranged eccentrically so that a space is created for the bearing arrangement between the hub and the ring gear. In this case, it is advantageous that the bearing can be arranged in a space-saving manner. Optimum use is thus made of the valuable space in the transmission housing.

BRIEF DESCRIPTION OF THE DRAWING

The aforementioned properties, features and advantages of this invention and the way in which these are obtained will be clearer and more readily comprehensible as a result of the following description which is explained in more detail with reference to the drawings in which, shown diagrammatically and not to scale in each case.

DETAILED DESCRIPTION OF PREFERRED EMBODIMENTS

Figure 1:
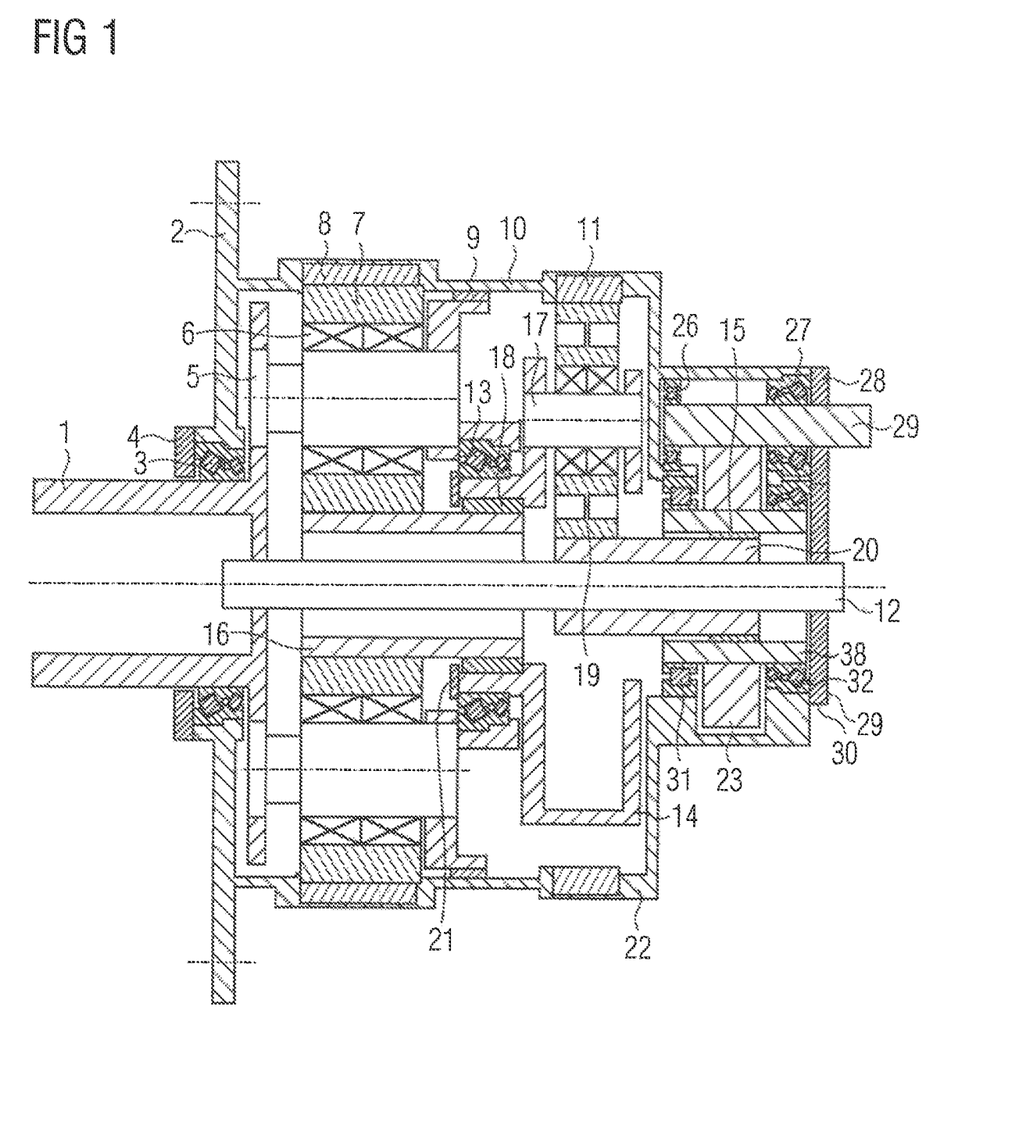
FIG. 1 shows a wind turbine transmission with a conventionally designed HSS.

FIG. 1 shows a wind turbine transmission with a conventionally designed HSS. The wind turbine transmission comprises a drive-side first planetary stage 1, 5, 7, 8, 16 as an LSS, an output-side second planetary stage 11, 14, 17, 19 20 downstream of the first planetary stage as an IMS and an output-side spur gear stage 23, 29 as an HSS, wherein the gear stages are surrounded by a transmission housing 22. The transmission housing 22 can be stored in a wind turbine nacelle by means of a gear stay 2 connected to the transmission housing 22 which also serves as a torque support.

The drive-side first planetary stage is referred to hereinafter as an LSS planetary stage, the output-side second planetary stage as the IMS planetary stage and the output-side spur gear stage as the HSS spur gear stage.

An LSS planet carrier 1 connectable to a rotor hub and an HSS pinion shaft 29 connectable to a generator are mounted in the transmission housing 22. The two planetary stages each comprise a hollow wheel 8, 11, a plurality of planetary wheels 7, 19 mounted in a planet carrier 1, 14 and a sun gear shaft 16, 20. In this case, the LSS planetary wheels 7 are rotatably mounted by way of LSS planetary gear bearings 6 on LSS planetary wheel axles 5 held in the LSS planet carrier 1. Moreover, the IMS planetary wheels 19 are rotatably mounted by way of LSS planetary gear bearings on IMS planetary wheel axles 17 held in the IMS planet carrier 14. The two sun gear shafts 16, 20 designed as hollow shafts, i.e. the LSS sun gear shaft 16 and the IMS sun gear shaft 20, surround a pitch tube 12 axially traversing the transmission housing 22 which forms a channel from the generator-side end to the rotor-side end of the wind turbine transmission.

The LSS planet carrier 1 of the drive-side LSS planetary stage has a hollow shaft directed towards the wind rotor for connection to a rotor hub of the wind rotor. The LSS planet carrier 1 is rotatably mounted in the transmission housing 22 by way of a drive-side bearing 3, an LSS guide bearing 9 and an output-side bearing 13. In this case, the drive-side bearing 3 is protected from environmental influences by a rotor-side transmission cover 4. Moreover, the LSS guide bearing 9 is arranged on a housing flange 10 which connects the LSS hollow wheel 8 and the IMS hollow wheel 11.

The LSS sun wheel shaft 16, which is connected in a rotationally fixed manner to a sun wheel of the drive-side LSS planetary stage, is connected to the IMS planet carrier 14 of the IMS planetary stage by way of a first coupling 18. In this case, the IMS planet carrier 14 of the IMS planetary stage has a drive-side hollow shaft which concentrically surrounds an end section of the LSS sun wheel shaft 16 of the drive-side LSS planetary stage. The first coupling 18, which may be designed as a short-tooth coupling, between the two planetary stages may be formed by an external tooth system on the LSS sun wheel shaft 16 of the drive-side LSS planetary stage and by an internal tooth system on the hollow shaft of the IMS planet carrier 14 of the IMS planetary stage.

Like the LSS planet carrier 1, the IMS planet carrier 14 is rotatably mounted in the transmission housing 22 by way of the output-side bearing 13. In this case, a fixing cover 21 is arranged on the drive-side end of the hollow shaft of the IMS planet carrier 14 which also forms a stop for an inner ring of the output-side bearing 13.

In addition to the HSS pinion shaft 29, the HSS spur gear stage comprises an HSS spur gear 23 meshing therewith and an HSS hollow shaft 38 which is coaxially surrounded by the HSS spur gear 23 and is connected to the latter in a rotationally fixed manner. In this case, the HSS hollow shaft 38 is rotatably mounted in a rotor-side bearing 31 and a generator-side bearing 32 in the transmission housing 22. In this case, the generator-side bearing 32 is protected from environmental influences by a generator-side cover 30 of the HSS hollow shaft 38.

In an analogous manner, the HSS pinion shaft 29 is rotatably mounted in a rotor-side bearing 26 and a generator-side bearing 27 in the transmission housing 22. In this case, the generator-side bearing 27 is protected from environmental influences by a generator-side cover 28 of the HSS pinion shaft 29.

The IMS sun gear shaft 20 connected in a rotationally fixed manner to a sun wheel of the IMS planetary stage is connected to the hollow shaft 38 of the HSS spur gear stage by way of a second coupling 15 which coaxially surrounds an end section of the IMS sun gear shaft 20. The second coupling 15, which may be designed as a short-tooth coupling, between the IMS planetary stage and the HSS spur gear stage is in this case formed by an external tooth system on the IMS sun gear shaft 20 of the IMS planetary stage and by an internal tooth system on the hollow shaft 38 of the HSS spur gear stage.

Figure 2:
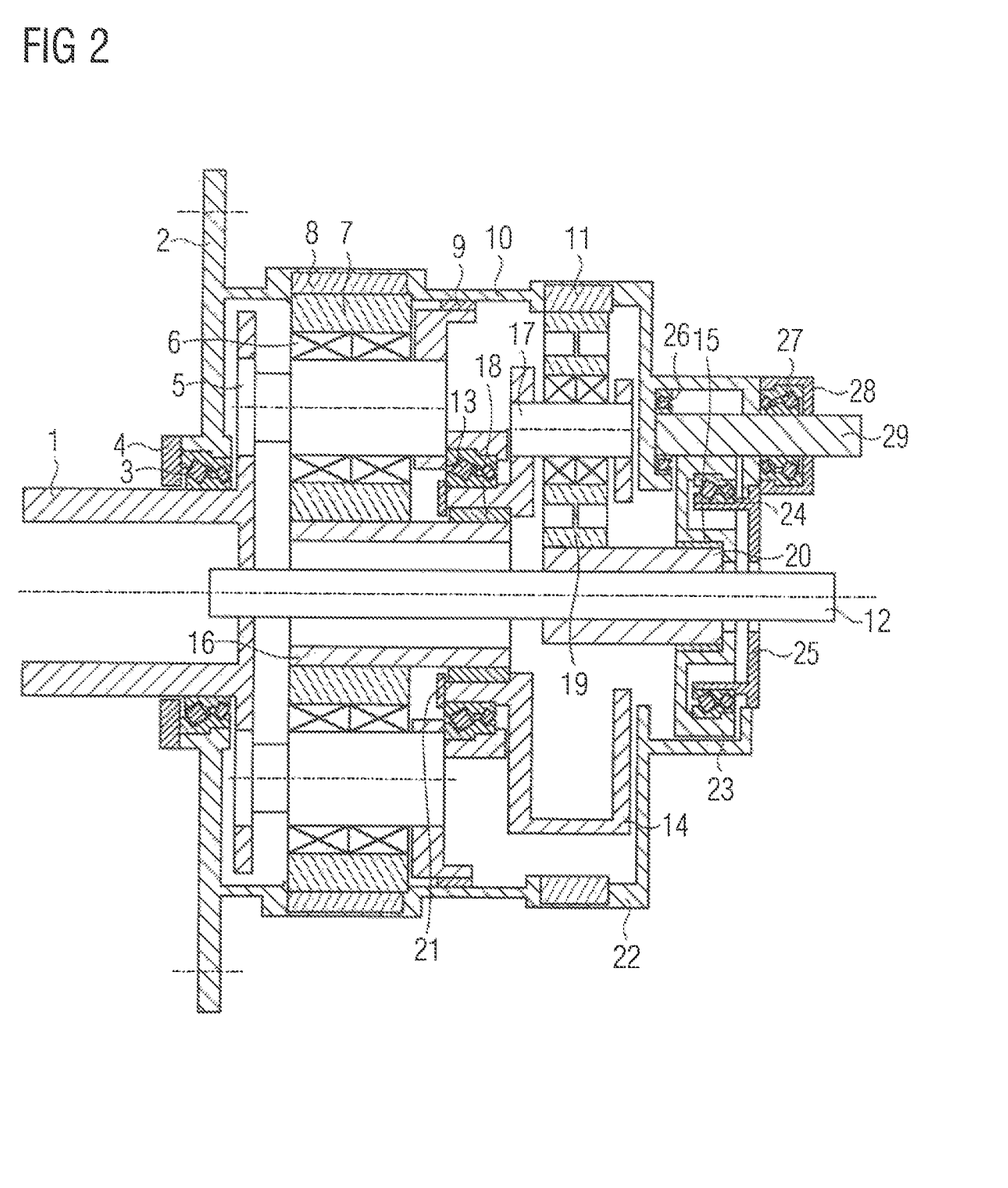
FIG. 2 shows a wind turbine transmission with an HSS according to the invention.

FIG. 2 shows a wind turbine transmission with an HSS designed according to the invention. As in the case of the wind turbine transmission shown in FIG. 1, this is a three-stage transmission, wherein the LSS planetary gear stage and the IMS planetary gear stage are designed as in the wind turbine transmission shown in FIG. 1. A significant difference to the wind turbine transmission shown in FIG. 1 is the HSS: while in the case of the conventionally designed HSS, the HSS spur gear 23 is arranged in a rotationally fixed manner on a rotatably mounted HSS hollow shaft, in the case of the HSS, shown in FIG. 2, the HSS spur gear 23 itself is rotatably mounted in the transmission housing 22, i.e. an HSS hollow shaft is omitted.

The HSS spur gear 23 is mounted on a carrier element 25 by means of a bearing 24 which is firmly connected to the transmission housing 22.

In this case, the IMS sun wheel shaft 20 connected to a sun wheel of the IMS planetary stage in a rotationally fixed manner is directly connected to the HSS spur gear 23 by way of a second coupling 15. The second coupling 15, which may be designed as a short-tooth coupling, between the IMS planetary stage and the HSS spur gear 23, is in this case formed by an external tooth system to the IMS sun gear shaft 20 of the IMS planetary stage and by an internal tooth system to the HSS spur gear 23 of the HSS spur gear stage.

Figure 3:
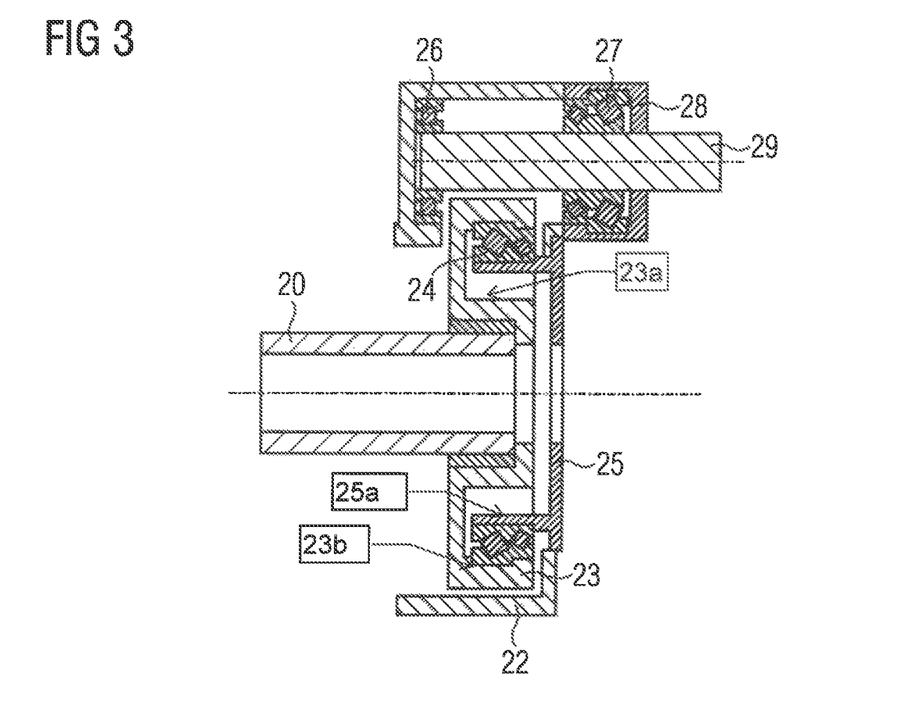
FIG. 3 shows a separate representation of the HSS shown in FIG. 2.

FIG. 3 is a separate view of the HSS shown in FIG. 2. In this way, it is shown, among other things, that the entire HSS, comprising the HSS spur gear 23 and the HSS pinion shaft 29, can be constructed as an independent module and mounted on the transmission housing. In this case, the HSS spur gear 23 is mounted on the generator side in the transmission housing 22. The carrier element 25 has a circumferential web 25a pointing away from the the generator side into a generator-side recess 23a of the HSS spur gear 23. The bearing 24 is arranged between a radially outward pointing raceway of the circumferential web 25a of the carrier element 25 and a radially inward pointing raceway of an inner circumference 23b of a ring gear of the HSS spur gear 23. The web 25a is arranged so as to support the bearing arrangement 24 of the HSS spur gear 23 between the hub and the ring gear in a space-saving manner.

Figure 4:
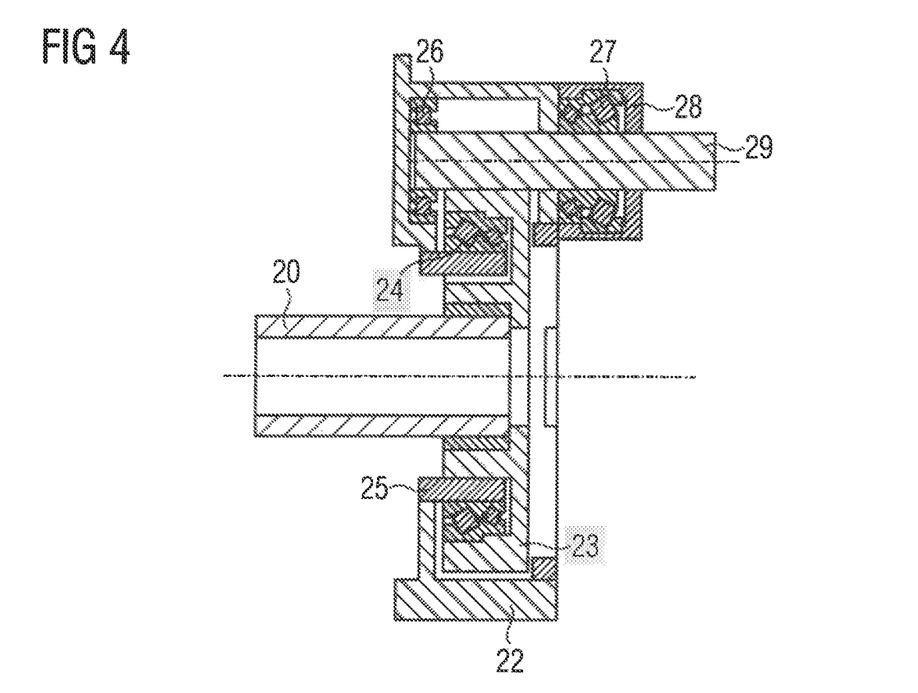
FIG. 4 shows an alternative embodiment of an HSS.

FIG. 4 shows an alternative embodiment of an HSS according to the invention. In this case, the HSS spur gear 23 is mounted on the rotor side in the transmission housing 22. The carrier element 25 supporting the bearing 24 projects on the rotor side into a rotor-side recess 23. The bearing 24 is arranged between the carrier element 25 and a radially outwardly extending inner circumference of a ring gear of the HSS spur gear 23.

Figure 5:
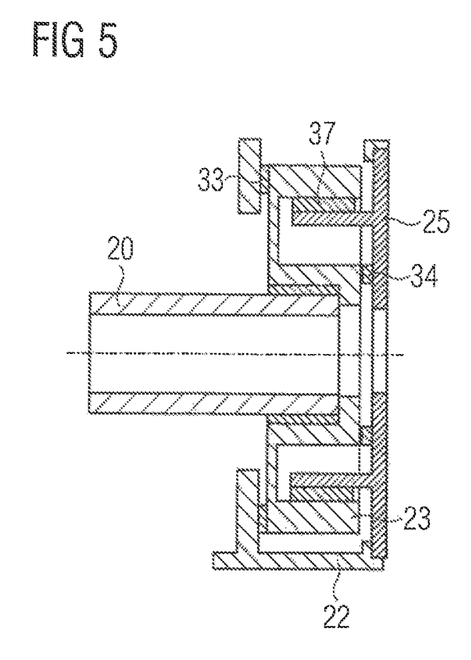
FIG. 5 shows an embodiment of an HSS with journal bearings.

FIG. 5 shows an embodiment of an HSS with journal bearings. In this case, the HSS spur gear 23 is mounted on the generator side in the transmission housing 22. The carrier element 25 supporting the radial journal bearing 37 projects on the generator side into a generator-side recess of the HSS spur gear 23. The radial journal bearing 37 is arranged between the carrier element 25 and a radially further outward circumferential inner circumference of a ring gear of the HSS spur gear 23. In addition, a rotor-side end face of the HSS spur gear 23 is supported by means of a rotor-side axial roller bearing 33 on a rotor-side support element which is connected to the transmission housing in a fixed manner. In addition, a generator-side end face of the HSS spur gear 23 is supported by means of a generator-side axial roller bearing 34 on a generator-side carrier element 25 which is connected to the transmission housing 22 in a fixed manner.

Figure 6:
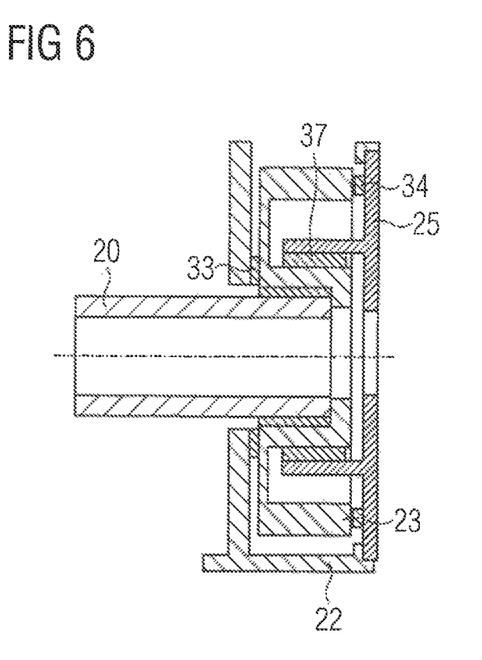
FIG. 6 shows an alternative embodiment of an HSS with journal bearings.

FIG. 6 shows an alternative embodiment of an HSS with journal bearings. In this case, the HSS spur gear 23 is mounted on the generator side in the transmission housing 22. The carrier element 25 supporting the radial journal bearing 37 projects on the generator side into a generator-side recess of the HSS spur gear 23. The radial journal bearing 37 is arranged between the carrier element 25 and a radially further inward circumferential outer circumference of the HSS spur gear 23. In addition, a rotor-side end face of the HSS spur gear 23 is supported by means of a rotor-side axial roller bearing 33 on a rotor-side support element which is connected to the transmission housing in a fixed manner. In addition, a generator-side end face of the HSS spur gear 23 is supported by means of a generator-side axial roller bearing 34 on a generator-side carrier element 25 which is connected to the transmission housing 22 in a fixed manner.

Figure 7:
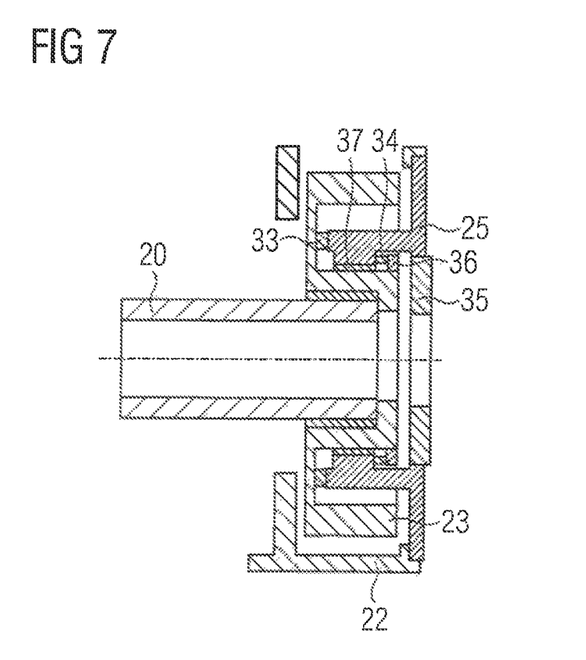
FIG. 7 shows a further embodiment of an HSS with journal bearings.

FIG. 7 shows a further embodiment of an HSS with a journal bearing. In this case, the HSS spur gear 23 is mounted on the generator side in the transmission housing 22. The carrier element 25 supporting the radial journal bearing 37 projects on the generator side into a generator-side recess of the HSS spur gear 23. The radial journal bearing 37 is arranged between the carrier element 25 and a radially further inward circumferential outer circumference of the HSS spur gear 23. In addition, an end face directed towards the rotor of an axial fixing disk 36, which is axially immovably fastened to the HSS spur gear 23, is supported on the carrier element 25 by means of a generator-side axial roller bearing 34. In addition, an end face directed towards the generator of the HSS spur gear 23 is supported on the carrier element 25 by means of a rotor-side axial roller bearing 33. In this case, the carrier element 25 is axially fixed by a cover 35 of the transmission housing 22.

Figure 8:
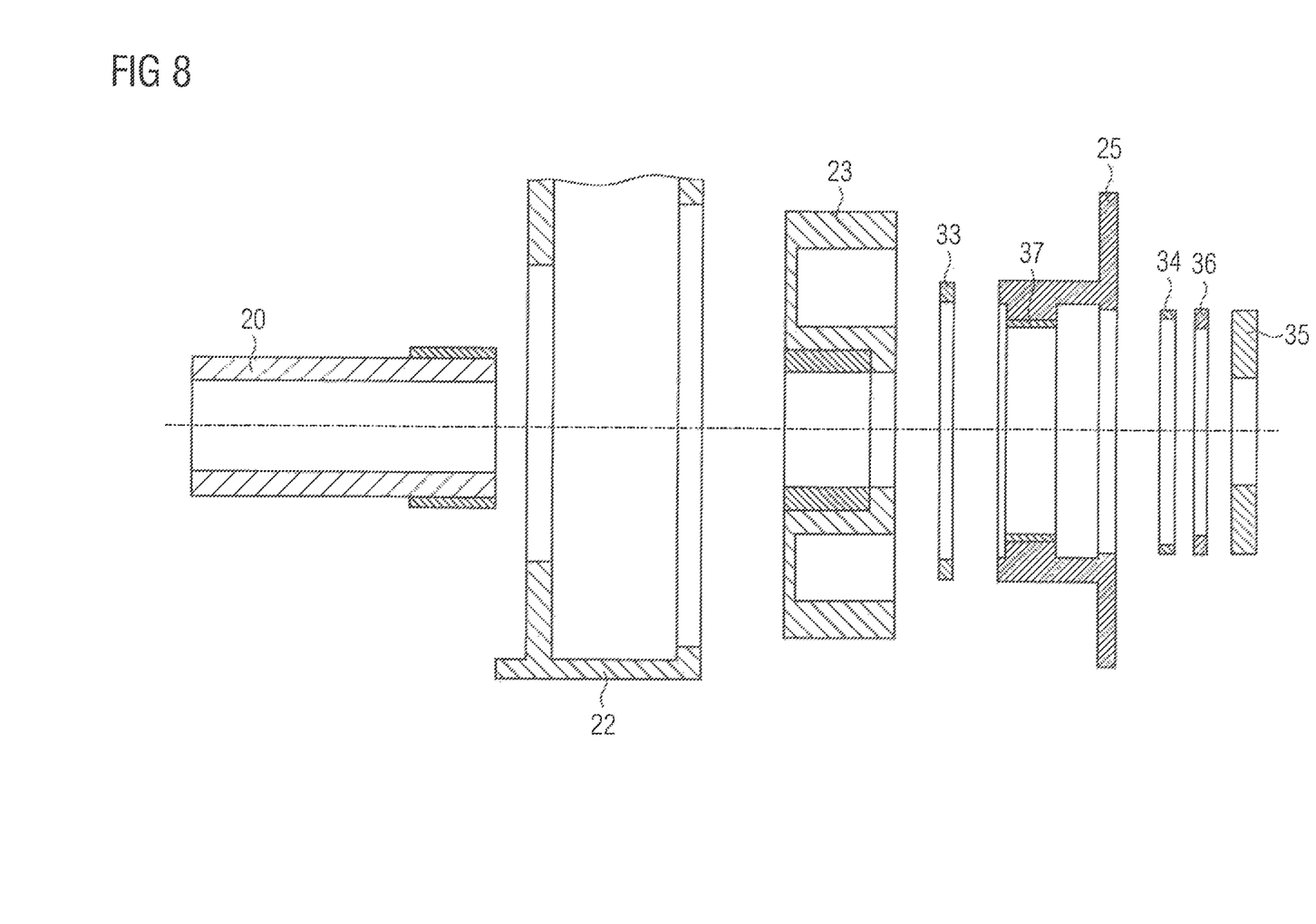
FIG. 8 shows an exploded view of FIG. 7.

FIG. 8 shows an exploded view of FIG. 7. The IMS sun gear shaft 20 with an external tooth system on the generator-side end circumference is arranged in the transmission housing 22. The HSS spur gear 23 with an internal tooth system on a radially inner circumference is likewise arranged in the transmission housing 22. In this case, the sun gear shaft 20 and the HSS spur gear 23 are pushed into one another in such a way that the outer tooth system of the sun gear shaft 20 meshes with the internal tooth system of the HSS spur gear 23. From the generator side, a rotor-side axial journal bearing 33, a carrier element 25 with a radial journal bearing 37, a generator-side axial journal bearing 34 and an axial fixing disk 36 are inserted into a generator-side recess of the HSS spur gear 23. Finally, the generator-side recess of the HSS spur gear 23 is closed by a cover 35.

What is claimed is:

1. A wind turbine transmission, comprising:
   a transmission housing having a rotor side and a generator side;
   a carrier element connected to the generator side of the transmission housing and comprising a circumferential web projecting axially away from the generator side toward the rotor side;

a high-speed spur gear stage directly mounted in the transmission housing and comprising an HSS (High Speed Stage) spur gear having an outer circumference carrying a ring gear meshing with an HSS pinion shaft and an interior generator-side circumferential recess in which the web projects, and a bearing arranged between an inner circumference of the ring gear and the web, said HSS spur gear having a rotor-side hub configured to engage with a coupling connecting the HSS spur gear with an intermediate-stage (IMS) sun gear shaft arranged upstream of the high-speed spur gear stage.

2. The wind turbine transmission of claim 1, wherein the HSS pinion shaft forms an output shaft of the wind turbine transmission.

3. The wind turbine transmission of claim 1, wherein the HSS spur gear is mounted on one side of the transmission housing.

4. The wind turbine transmission of claim 1, wherein the HSS spur gear is mounted in the transmission housing on a rotor side or on a generator side.

5. The wind turbine transmission of claim 1, wherein the HSS spur gear is forged, welded or screwed from a plurality of elements or produced from a solid body by means of a cutting method.

6. A wind turbine transmission, comprising:

a transmission housing having a rotor side and a generator side;

a carrier element connected to the generator side of the transmission housing and comprising a circumferential web projecting axially away from the generator side toward the rotor side;

a high-speed spur gear stage directly mounted in the transmission housing and comprising an HSS (High Speed Stage) spur gear having a rotor-side hub and an outer circumference carrying a ring gear meshing with an HSS pinion shaft and an interior generator-side circumferential recess in which the web projects, and a bearing configured as a journal bearing and arranged between an inner circumference of the ring gear and the web, said rotor-side hub being configured to engage with a coupling connecting the HSS spur gear with an intermediate-stage (IMS) sun gear shaft arranged upstream of the high-speed spur gear stage.

7. The wind turbine transmission of claim 6, wherein the HSS pinion shaft forms an output shaft of the wind turbine transmission.

8. The wind turbine transmission of claim 6, wherein the HSS spur gear is mounted on one side of the transmission housing.

9. The wind turbine transmission of claim 6, wherein the HSS spur gear is mounted in the transmission housing on a rotor side or on a generator side.

10. The wind turbine transmission of claim 6, wherein the HSS spur gear is forged, welded or screwed from a plurality of elements or produced from a solid body by means of a cutting method.

* * * * *